United States Patent
Shim et al.

(10) Patent No.: US 9,880,343 B2
(45) Date of Patent: Jan. 30, 2018

(54) BACKLIGHT UNIT USING MICRO OPTICAL SWITCH AND 3D IMAGE DISPLAY DEVICE

(71) Applicant: SAMSUNG ELECTRONICS CO., LTD., Suwon-si (KR)

(72) Inventors: Dongsik Shim, Hwaseong-si (KR); Hongseok Lee, Seongnam-si (KR); Seogwoo Hong, Yongin-si (KR); Changsoo Lee, Seoul (KR); Hyunjoon Kim, Seoul (KR); Bongsu Shin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/090,959

(22) Filed: Apr. 5, 2016

(65) Prior Publication Data
US 2017/0059761 A1  Mar. 2, 2017

(30) Foreign Application Priority Data
Sep. 2, 2015 (KR) .................. 10-2015-0124229

(51) Int. Cl.
*F21V 7/04* (2006.01)
*F21V 8/00* (2006.01)
*G02B 27/22* (2006.01)

(52) U.S. Cl.
CPC .......... *G02B 6/005* (2013.01); *G02B 6/0051* (2013.01); *G02B 6/0053* (2013.01); *G02B 6/0055* (2013.01); *G02B 27/22* (2013.01)

(58) Field of Classification Search
CPC ..................................................... G02B 27/22
See application file for complete search history.

(56) References Cited

U.S. PATENT DOCUMENTS

| | | | |
|---|---|---|---|
| 6,288,829 B1 | 9/2001 | Kimura | |
| 7,954,967 B2 | 6/2011 | Kashiwagi et al. | |
| 8,274,556 B2 * | 9/2012 | Cha | G02B 27/2214 345/102 |
| 8,730,282 B2 * | 5/2014 | Bae | G09G 5/10 345/102 |
| 9,646,543 B2 * | 5/2017 | Kang | G09G 3/3406 |
| 2006/0209012 A1 | 9/2006 | Hagood, IV | |
| 2011/0187764 A1 | 8/2011 | Bae et al. | |
| 2013/0070445 A1 | 3/2013 | Shim et al. | |
| 2013/0088856 A1 | 4/2013 | Kim et al. | |
| 2014/0131744 A1 | 5/2014 | Shim et al. | |
| 2014/0133003 A1 | 5/2014 | Shim et al. | |

FOREIGN PATENT DOCUMENTS

JP 5656942 B2 1/2015

* cited by examiner

*Primary Examiner* — Thien M Le
*Assistant Examiner* — April Taylor
(74) *Attorney, Agent, or Firm* — Sughrue Mion, PLLC

(57) ABSTRACT

A backlight unit using a micro optical switch and a three-dimensional (3D) image display device are provided. The backlight unit includes a light source configured to irradiate light, a light guide plate configured to guide the irradiated light, an optical switch array including micro optical switches disposed above the light guide plate for each of cells of the backlight unit, and a lens array disposed above and corresponding to the optical switch array. Each of the micro optical switches includes a substrate, a first electrode layer disposed on the substrate and including first holes, and a second electrode layer spaced apart from the first electrode layer and including second holes not facing the first holes.

15 Claims, 7 Drawing Sheets

BACKLIGHT UNIT USING MICRO OPTICAL SWITCH AND 3D IMAGE DISPLAY DEVICE

CROSS-REFERENCE TO RELATED APPLICATION

This application claims priority from Korean Patent Application No. 10-2015-0124229, filed on Sep. 2, 2015, in the Korean Intellectual Property Office, the disclosure of which is incorporated herein by reference in its entirety.

BACKGROUND

1. Field

Apparatuses consistent with exemplary embodiments relate to a backlight unit using a micro optical switch and a three-dimensional (3D) image display device that may switch between a two-dimensional (2D) mode and a 3D mode.

2. Description of the Related Art

Recently, many 3D movies are produced and accordingly many technologies related to a 3D image display device are studied. The 3D image display device displays a 3D image based on binocular parallax, and a currently commercialized 3D image display device uses binocular parallax of both eyes and allows an audience to feel a 3D effect by providing an image for a left eye and an image for a right eye each having a different viewpoint to the audience's left eye and right eye, respectively. The 3D image display device is classified into a glasses-type 3D image display device using special glasses and a non glasses-type 3D image display device not using glasses.

For user convenience, non glasses-type technologies rather than technologies using glasses may be used. For compatibility with an existing display panel and existing content, research into a 3D image display device that may switch between a 2D mode showing a 2D image and a 3D mode showing a 3D image among non glasses-type 3D image display devices are under progress.

SUMMARY

Exemplary embodiments may address at least the above problems and/or disadvantages and other disadvantages not described above. Also, the exemplary embodiments are not required to overcome the disadvantages described above, and may not overcome any of the problems described above.

One or more exemplary embodiments provide backlight units capable of controlling an output direction of light by using a micro optical switch.

One or more exemplary embodiments provide 3D image display devices capable of switching between a 2D mode and a 3D mode by using a micro optical switch.

According to an aspect of an exemplary embodiment, there is provided a backlight unit including a light source configured to irradiate light, a light guide plate configured to guide the irradiated light, an optical switch array including micro optical switches disposed above the light guide plate for each of cells of the backlight unit, and a lens array disposed above and corresponding to the optical switch array. Each of the micro optical switches includes a substrate, a first electrode layer disposed on the substrate and including first holes, and a second electrode layer spaced apart from the first electrode layer and including second holes not facing the first holes.

The second electrode layer may be configured to move to the first electrode layer, and cover the first holes, in response to a voltage being applied between the first electrode layer and the second electrode layer to generate electrostatic attraction between the first electrode layer and the second electrode layer.

Each of the first holes may have a width that is less than or equal to a width between an adjacent pair of the second holes.

The substrate may be transparent.

Each of the micro optical switches may further include a spacer disposed between the first electrode layer and the second electrode layer and configured to support the second electrode layer.

The backlight unit may further include an optical film disposed above the second electrode layer.

The backlight unit may further include a reflector disposed below the light guide plate and configured to reflect light.

The backlight unit may further include a diffusion layer disposed between the light guide plate and the optical switch array.

The backlight unit may further include an insulating layer disposed above the first electrode layer.

According to an aspect of another exemplary embodiment, there is provided a three-dimensional (3D) image display device including a backlight unit configured to emit light, and a display panel configured to produce an image, using the emitted light. The backlight unit may include a light source configured to irradiate light, a light guide plate configured to guide the irradiated light, an optical switch array including micro optical switches disposed above the light guide plate for each of cells of the backlight unit, and a lens array disposed above and corresponding to the optical switch array. Each of the micro optical switches may include a substrate, a first electrode layer disposed on the substrate and including first holes, and a second electrode layer spaced apart from the first electrode layer and including second holes not facing the first holes.

The second electrode layer may be configured to move to the first electrode layer, and cover the first holes, in response to a voltage being applied between the first electrode layer and the second electrode layer to generate electrostatic attraction between the first electrode layer and the second electrode layer.

Each of the first holes may have a width that is less than or equal to a width between an adjacent pair of the second holes.

The substrate may be transparent.

Each of the micro optical switches may further include a spacer disposed between the first electrode layer and the second electrode layer and configured to support the second electrode layer.

The backlight unit may further include an optical film disposed above the second electrode layer.

The backlight unit may further include a reflector disposed below the light guide plate and configured to reflect light.

The backlight unit may further include an insulating layer disposed above the first electrode layer.

The backlight unit may further include a space layer disposed between the optical switch array and the lens array.

The backlight unit may further include a diffuser configured to cause the guided light to diffuse uniformly, a prism sheet configured to correct a light progressing path of the diffused light, and a brightness enhancement film disposed above the prism sheet. The diffuser, the prism sheet, and the brightness enhancement film may be disposed between the light guide plate and the optical switch array.

BRIEF DESCRIPTION OF THE DRAWINGS

The above and/or other aspects will be more apparent by describing exemplary embodiments with reference to the accompanying drawings, in which.

DETAILED DESCRIPTION

Figure 1:
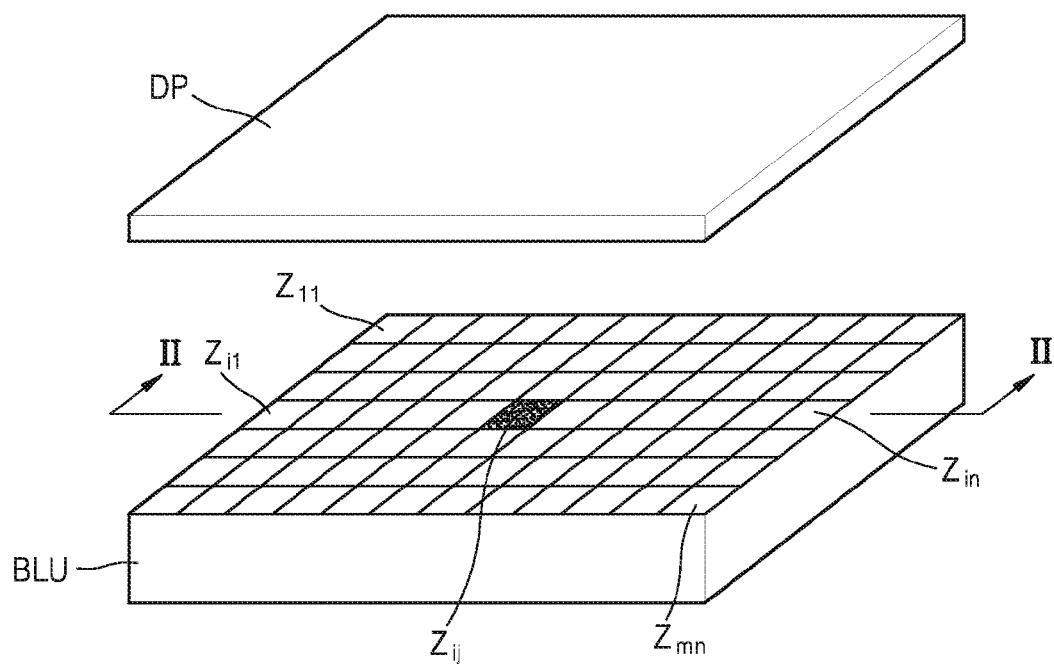
FIG. 1 is a perspective view illustrating a 3D image display device according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "comprises" and/or "comprising" used herein specify the presence of stated features or components, but do not preclude the presence or addition of one or more other features or components. In addition, the terms such as "unit," "-er (-or)," and "module" described in the specification refer to an element for performing at least one function or operation, and may be implemented in hardware, software, or the combination of hardware and software.

FIG. 1 is a perspective view illustrating a 3D image display device according to an exemplary embodiment. The 3D image display device illustrated in FIG. 1 includes a backlight unit BLU, and a display panel DP for producing an image by using light from the backlight unit BLU. The 3D image display device according to an exemplary embodiment may include the backlight unit BLU that may adjust an output direction of light and display a 3D image by separating an image for a left eye from an image for a right eye. The backlight unit BLU includes a plurality of cells $Z_{11}, \ldots, Z_{mn}$ ("m" and "n" are natural numbers), and each cell may adjust an output direction of light. Here, a cell $Z_{mn}$ may represent a unit that may be independently driven to adjust an output direction of light. For example, the cell $Z_{mn}$ may be arranged in a 2D structure. The display panel DP may include a plurality of pixels, and produce an image by controlling light transmittance for each pixel. The display panel DP may be a liquid crystal display (LCD) panel but is not limited thereto.

Figure 2:
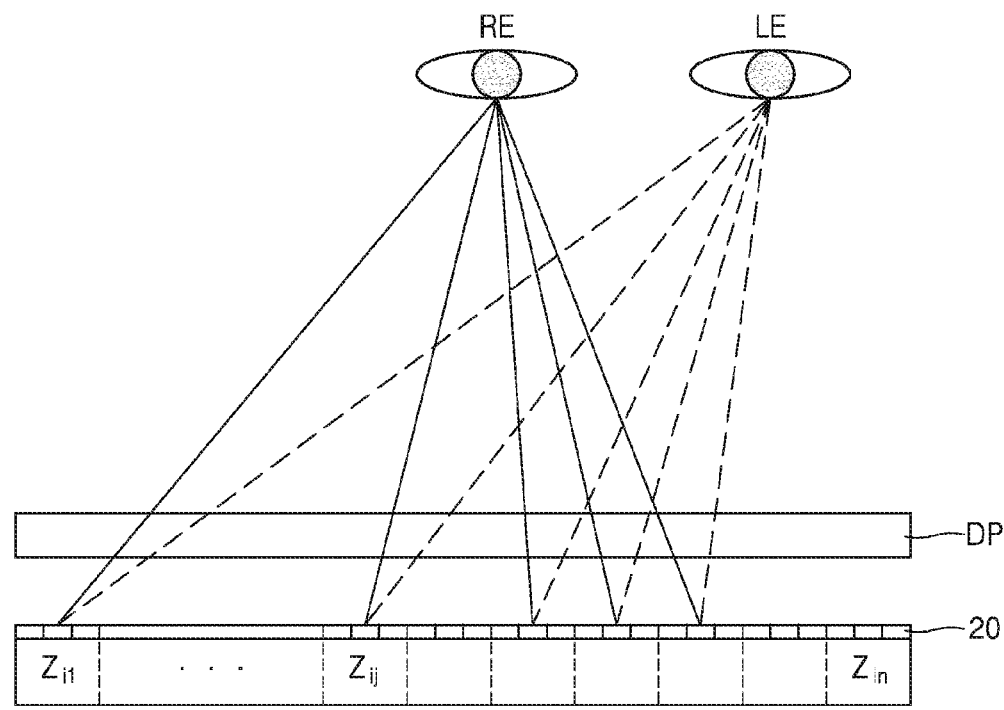
FIG. 2 is a cross-sectional view taken along a line II-II of FIG. 1.

FIG. 2 is a cross-sectional view taken along a line II-II of FIG. 1. Referring to FIG. 2, each cell $Z_{i1}, \ldots, Z_{ij}, \ldots,$ or $Z_{in}$ includes at least one micro optical switch 20, and adjust an output direction of light for each cell independently and selectively. Each cell $Z_{i1}, \ldots, Z_{ij}, \ldots,$ or $Z_{in}$ may selectively send light to a left eye LE or a right RE, or simultaneously send the same image to the left eye LE and the right eye RE by using the micro optical switch 20. In the case of separating light and sending the light to the left eye LE and the right eye RE, a 3D image may be displayed, and in the case of simultaneously sending the same image to the left eye LE and the right eye RE, a 2D image may be displayed. Displaying a 3D image is referred to as a 3D mode, and displaying a 2D image is referred to as a 2D mode. The 3D image display device according to an exemplary embodiment may switch between the 2D mode and the 3D mode.

Referring to FIG. 2, a 3D image may be displayed by adjusting an output direction of light for each cell $Z_{i1}, \ldots, Z_{ij}, \ldots,$ or $Z_{in}$ and separating the fields of vision by using the micro optical switch 20 of the backlight unit BLU, and displaying an image for a left eye and an image for a right eye in time sequence or displaying an image for a left eye and an image for a right eye via space division.

Figure 3:
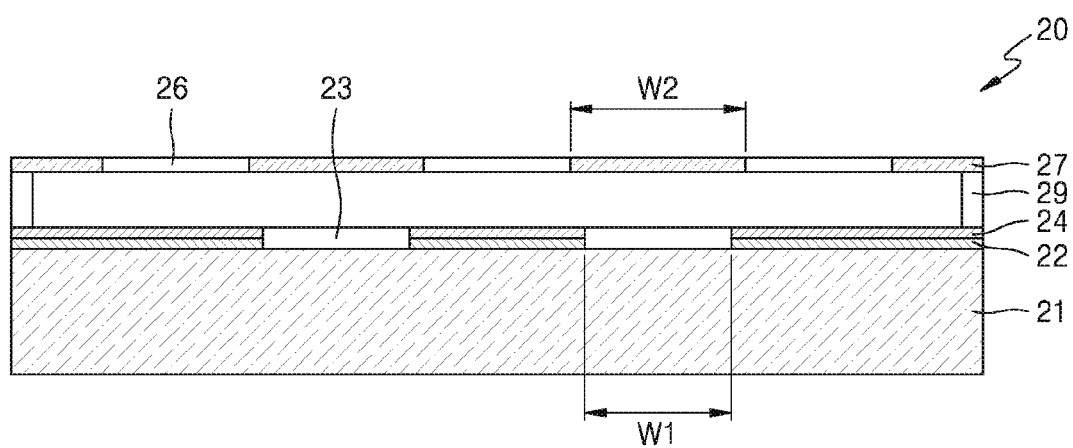
FIG. 3 is a cross-sectional view illustrating a micro optical switch according to an exemplary embodiment.
Figure 4:
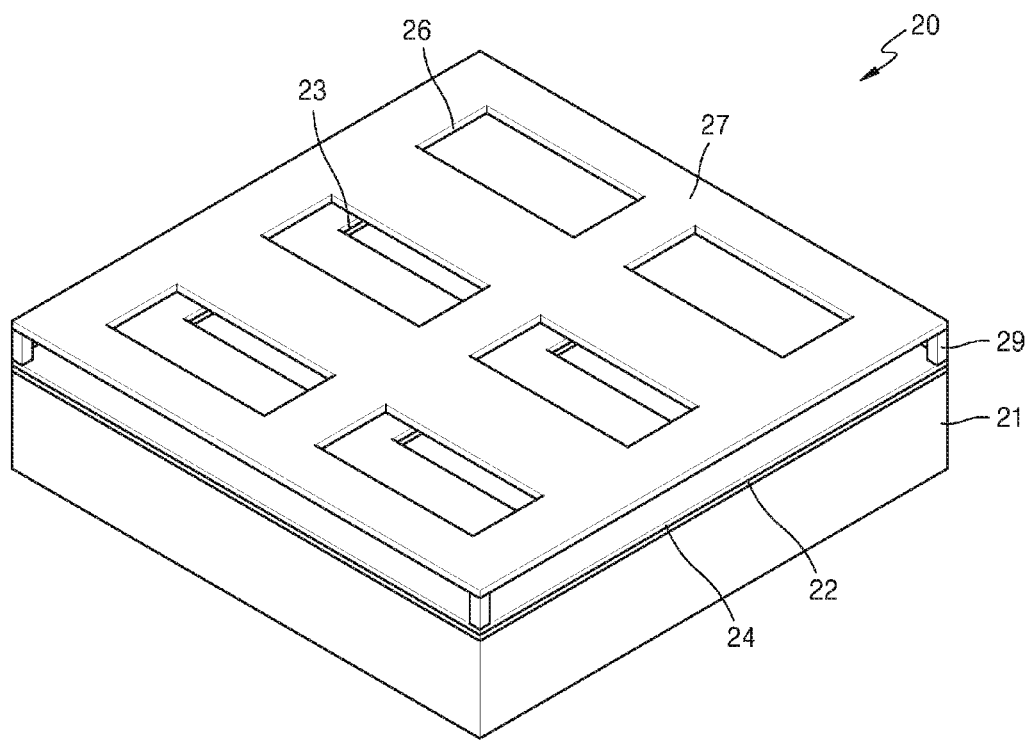
FIG. 4 is a perspective view illustrating the micro optical switch illustrated in FIG. 3.

FIG. 3 is a cross-sectional view illustrating the micro optical switch 20 according to an exemplary embodiment, and FIG. 4 is a perspective view illustrating the micro optical switch 20 illustrated in FIG. 3. At least one micro optical switch 20 may be provided to one cell $Z_{i1}, \ldots, Z_{ij}, \ldots,$ or $Z_{in}$ as illustrated in FIG. 2. For example, a plurality of micro optical switches 20 may be arranged in an array structure in one cell $Z_{i1}, \ldots, Z_{ij}, \ldots,$ or $Z_{in}$. A number of cells, a size of a cell, a number of micro optical switches provided to one cell, or a size of a micro optical switch may change depending on a size of a display of an image display device, a number of pixels, resolution, etc. FIGS. 3 and 4 illustrate one micro optical switch 20 for convenience.

The micro optical switch 20 includes a substrate 21, a first electrode layer 22 provided to the substrate 21, and a second electrode layer 27 spaced apart from the first electrode layer 22.

The substrate 21, for example, may be a transparent substrate. The substrate 21, for example, may be a glass substrate. The first electrode layer 22 includes at least one first hole 23. The second electrode layer 27 includes at least one second hole 26. The first hole 23 and the second hole 26 may not face each other. For example, the first hole 23 and the second hole 26 may be arranged in zigzags along a horizontal direction of the drawing. The first hole 23 and the second hole 26 may be closed or opened depending on an on/off operation of the micro optical switch 20. During an on-operation of the micro optical switch 20, the first hole 23 and the second hole 26 may serve a path through which light passes.

The first hole 23 and the second hole 26 may be provided in various shapes and numbers in a range of not allowing the first hole 23 and the second hole 26 to meet each other during an off-operation of the micro optical switch 20. For example, a first width W1 of the first hole 23 may be equal to or less than a second width W2 between adjacent second holes 26 of the second electrode layer 27. The first hole 23 and the second hole 26 may have, for example, a quadrangular shape, but are not limited thereto.

The first electrode layer 22 and the second electrode layer 27 may include, for example, an opaque conductive material. The first electrode layer 22 and the second electrode layer 27 may include, for example, at least one among Ti, Au, Ag, Pt, Cu, Al, Ni, and Cr, but are not limited thereto.

The first electrode layer 22 and the second electrode layer 27 are spaced apart from each other. An insulating layer 24 is further provided on the first electrode layer 22. The insulating layer 24 may prevent the first electrode layer 22 and the second electrode layer 27 from being short-circuited. To support the second electrode layer 27, a spacer 29 is provided between the first electrode layer 22 and the second electrode layer 27. The spacer 29 may maintain an interval between the first electrode layer 22 and the second electrode layer 27, and support the second electrode layer 27 when the second electrode layer 27 moves toward the first electrode layer 22 or is separated from the first electrode layer 22. The thickness of the spacer 29 may be set so that the on/off switching operation of the micro optical switch 20 may be swiftly performed. For example, when a distance between the first electrode layer 22 and the second electrode layer 27 is too short, the first electrode layer 22 may contact the second electrode layer 27 even when a voltage is not applied, and thus the micro optical switch 20 may malfunction. Therefore, an appropriate interval is maintained so that this malfunction may not occur. At least two spacers 29 are provided to support the second electrode layer 29, and for example, may be provided in the form of posts at four corners between the first electrode layer 22 and the second electrode layer 27. However, the spacers 29 are not limited thereto, and two spacers 29 may be provided in the form of a lateral wall between the first electrode layer 22 and the second electrode layer 27.

The on/off operation of the micro optical switch 20 is described with reference to FIGS. 4 and 5.

FIG. 4 illustrates an on-operation of the micro optical switch 20. During the on-operation of the micro optical switch 20, the first hole 23 and the second hole 26 may be opened, and light may be emitted via the first hole 23 and the second hole 26. When a voltage is not applied between the first electrode layer 22 and the second electrode layer 27, the first electrode layer 22 and the second electrode layer 27 spaced apart from each other are maintained, and the first hole 23 and the second hole 26 may be opened. In this case, light incident via the substrate 21 may be emitted via the first hole 23 and the second hole 26.

Figure 5:
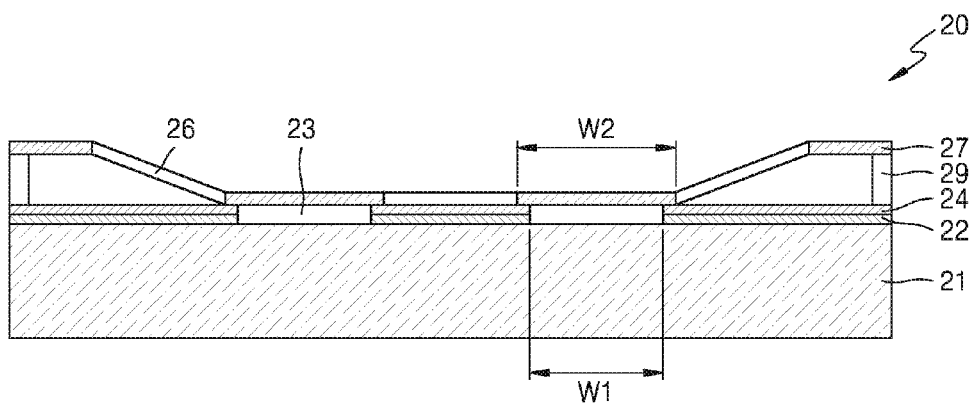
FIG. 5 is a cross-sectional view illustrating an operation of the micro optical switch illustrated in FIG. 3.

FIG. 5 is a cross-sectional view illustrating an operation of the micro optical switch 20 illustrated in FIG. 3. In detail, FIG. 5 illustrates an off-operation of the micro optical switch 20. During the off-operation of the micro optical switch 20, the first hole 23 is closed by the second electrode layer 27, and thus light cannot be emitted. When a voltage is applied between the first electrode layer 22 and the second electrode layer 27, electrostatic attraction acts, and thus the second electrode layer 27 is pulled toward the first electrode layer 22. A voltage may be applied so that the second electrode layer 27 may stick on the first electrode layer 22. When the second electrode layer 27 sticks on the first electrode layer 22, the first hole 23 is closed by the second electrode layer 27. In this case, because the first hole 23 is closed, light incident via the substrate 21 cannot be emitted.

Because the micro optical switch 20 according to an exemplary embodiment may be easily manufactured, the productivity of the micro optical switch 20 may be raised. Also, because during the off-operation of the micro optical switch 20, the first hole 23 is closed and thus light leakage may be prevented, a contrast ratio may be high. Also, because the micro optical switch 20 is on/off-driven by electrostatic attraction, an operation voltage is low, and an operation speed may be fast.

Figure 6:
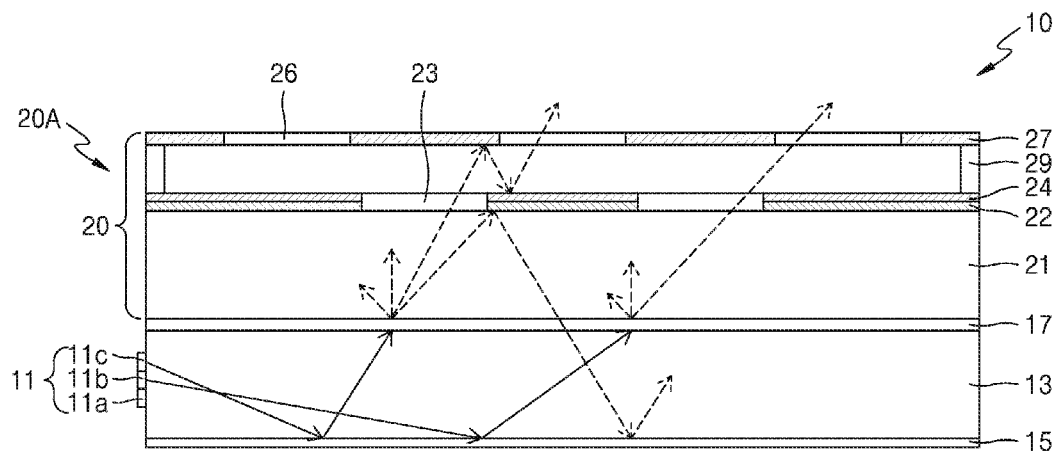
FIG. 6 is a cross-sectional view illustrating a backlight unit according to an exemplary embodiment.

FIG. 6 is a cross-sectional view illustrating a backlight unit 10 according to an exemplary embodiment.

The backlight unit 10 includes a light source 11 configured to irradiate light, a light guide plate 13 configured to guide light irradiated from the light source 11, and an optical switch array 20A provided to the light guide plate 13.

The light source 11 may include, for example, a light-emitting diode (LED), an organic light-emitting diode (OLED), or a laser diode (LD). In FIG. 6, the light source 11 includes, for example, a first light source 11$a$, a second light source 11$b$, and a third light source 11$c$ that irradiate light of different wavelengths, respectively. The light source 11 may be provided to one side of the light guide plate 13. Alternatively, the light source 11 may be provided to both sides of the light guide plate 13. For example, the first light source 11$a$ may irradiate red light, the second light source 11$b$ may irradiate green light, and the third light source 11$c$ may irradiate blue light. The light guide plate 13 may allow light to be transferred uniformly from one side to the other side of the light guide plate 13 by reflecting a portion of light irradiated from the light source 11 and transmitting a portion of the light.

A reflector 15 is further provided below the light guide plate 13. The reflector 15 may increase a light efficiency by reflecting light that goes out below the light guide plate 13 and sending back the light toward the upper side.

The optical switch array 20A may be provided for each of the plurality of cells $Z_{mn}$ as described with reference to FIG. 1. For convenience, FIG. 6 illustrates only one optical switch 20 of the optical switch array 20A, and the optical switch array 20A may include the plurality of micro optical switches 20. For example, the plurality of micro optical switches 20 may be arranged in a line or arranged in a matrix configuration inside one cell $Z_{mn}$.

Each of the plurality of micro optical switches 20 includes the substrate 21, the first electrode layer 22 provided on the substrate 21, and the second electrode layer 27 spaced apart from the first electrode layer 22. Because the micro optical switch 20 is substantially the same as that described with reference to FIGS. 3 to 5, description thereof is omitted.

A diffusion layer 17 is further provided between the light guide plate 13 and the substrate 21. The diffusion layer 17 may allow light to be uniformly distributed by diffusing light coming from the light guide plate 13, but is not limited thereto.

Light transmitted via the light guide plate 13 may be incident to the substrate 21. When the micro optical switch 20 is turned on, the light incident via the substrate 21 may be emitted via the first hole 23 and the second hole 26. When a voltage is applied between the first electrode layer 22 and the second electrode layer 27 and thus the micro optical switch 20 is turned off, the first hole 23 may be closed by the second electrode layer 27 and the light incident via the substrate 21 may be blocked. As described above, each micro optical switch 20 of the optical switch array 20A is on/off-adjusted independently, so that an output direction of light may be adjusted.

Because the backlight unit 10 according to an exemplary embodiment blocks or transmits light by using the micro optical switch 20, the light guide plate 13 does not need to have a total internal reflection function. Therefore, the structure of the light guide plate 13 may be simplified.

Figure 7:
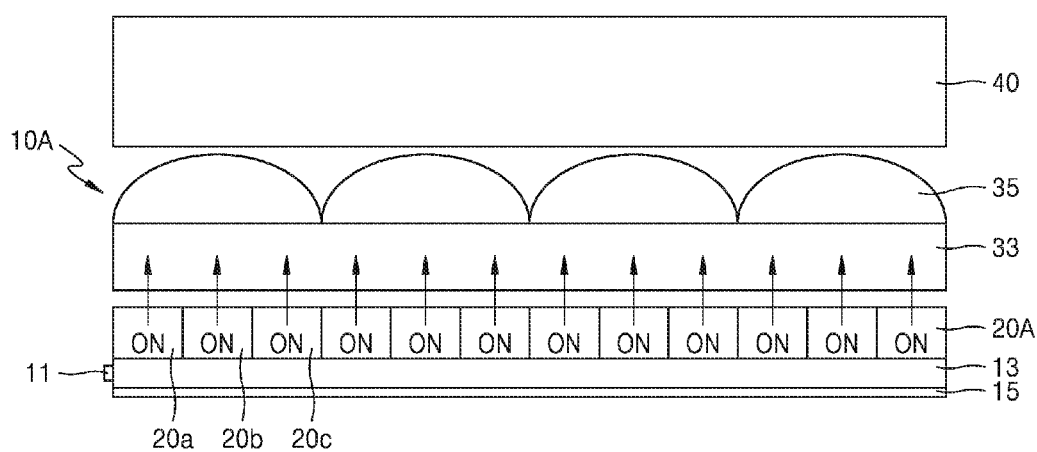
FIG. 7 is a cross-sectional view illustrating an operation of a 3D image display device in a 2D mode according to an exemplary embodiment.

FIG. 7 is a cross-sectional view illustrating an operation of a 3D image display device in a 2D mode according to an exemplary embodiment.

The 3D image display device includes a backlight unit 10A and a display panel 40 configured to produce an image by using light emitted from the backlight unit 10A. The display panel 40 may be an LCD panel, for example.

The backlight unit 10A may switch between a 2D image and a 3D image by adjusting an output direction of light for each of a plurality of pixels. The backlight unit 10A includes the light source 11 that irradiates light, the light guide plate 13 that guides the light irradiated from the light source 11, and the optical switch array 20A provided to the light guide plate 13. The reflector 15 is provided below the light guide plate 13.

Because the light source 11, the light guide plate 13, and the reflector 15 are substantially the same as those described with reference to FIG. 6, descriptions thereof are omitted.

The optical switch array 20A may be provided for each of the plurality of pixels $Z_{mn}$ described with reference to FIG. 1. The optical switch array 20A may include the plurality of micro optical switches 20. In FIG. 7, for example, the optical switch array 20A includes a first micro optical switch 20a, a second micro optical switch 20b, and a third micro optical switch 20c for each cell. However, a number of micro optical switches and arrangement of the micro optical switches in the optical switch array 20A are not limited thereto and may change variously. Because the first to third micro optical switches 20a, 20b, and 20c are substantially the same as the micro optical switch described with reference to FIGS. 3 to 5, descriptions thereof are omitted.

A lens array 35 is provided above the optical switch array 20A. The lens array 35 may serve as a direction adjuster that limits the direction of light that has passed through the optical switch array 20A. For example, the lens array 35 may be provided to correspond to the optical switch array 20A. For example, a unit lens of the lens array 35 may correspond to a unit cell of the optical switch array 20A. For example, in the case in which the optical switch array 20A includes the first to third micro optical switches 20a, 20b, and 20c in a unit cell, a unit lens of the lens array 35 may be disposed to correspond to the first to third micro optical switches 20a, 20b, and 20c.

For example, a unit lens of the lens array 35 may be provided for each cell, and the optical switch array 20A may be provided on a focal plane of the lens array 35. For example, in the case in which a cell (see $Z_{mn}$ of FIG. 1) has a 2D structure, the lens array 35 may have a 2D arrangement structure. A space layer 33 is further provided to secure an interval as a focal length between the lens array 35 and the optical switch array 20A. The space layer 33 may include a material having the same refractive index as that of the lens array 35, or may be integrally formed with the lens array 35.

A 2D mode and a 3D mode of a 3D image display device according to an exemplary embodiment are described with reference to FIGS. 7 and 8. Referring to FIG. 7, the first hole 23 (see FIG. 6) and the second hole 26 (see FIG. 6) of each micro optical switch may be opened by on-driving all micro optical switches of the optical switch array 20A. Light may be emitted via the opened first and second holes 23 and 26 and incident on the display panel 40 by using all the micro optical switches. Light incident on the display panel 40 from all directions may be output without orientation and may display a 2D image.

Figure 8:
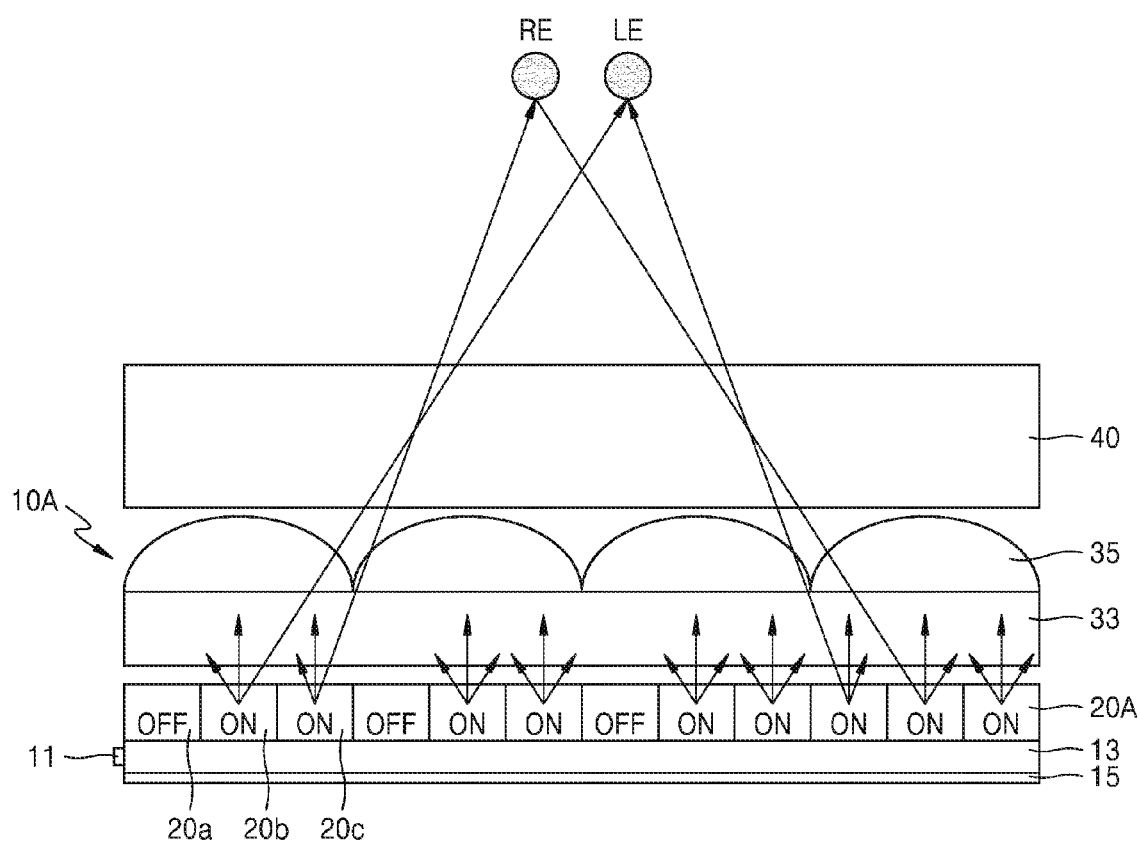
FIG. 8 is a cross-sectional view illustrating an operation of the 3D image display device illustrated in FIG. 7 in a 3D mode.

FIG. 8 is a cross-sectional view illustrating an operation of the 3D image display device illustrated in FIG. 7 in a 3D mode. Referring to FIG. 8, an output direction of light may be adjusted by turning on a portion of the micro optical switches of the optical switch array 20A, and turning off the rest of the micro optical switches. For example, light may be separated into and sent to a left eye region and a right eye region by turning off the first micro optical switch 20a and turning on the second and third micro optical switches 20b and 20c. For example, when the second micro optical switch 20b is turned on, light may be directed to a left eye LE, and when the third micro optical switch 20c is turned on, light may be directed to a right eye RE. Here, the second and third micro optical switches 20b and 20c may be simultaneously turned on, or turned on in time sequence. As described above, a 3D image may be displayed by separating light and sending the light to the left eye region and the right eye region through selective on/off adjustment of the micro optical switches.

Also, because the direction of emitted light changes depending on the location of a turned-on micro optical switch in the optical switch array, the locations of the left eye region and the right eye region may be adjusted differently via the on/off adjustment of the micro optical switches.

Figure 9:
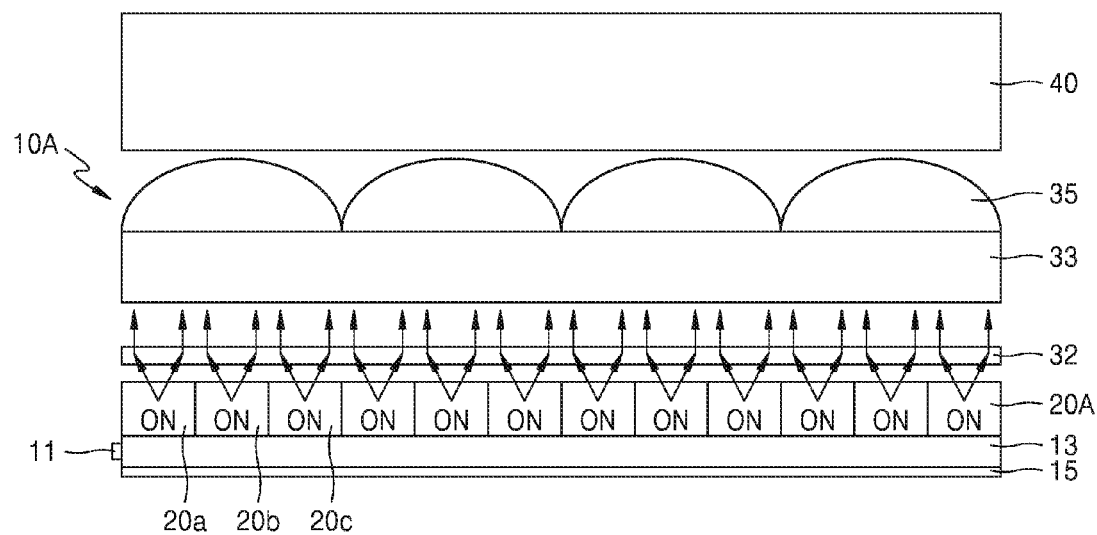
FIG. 9 is a cross-sectional view illustrating the 3D image display device illustrated in FIG. 7 further including an optical film.

FIG. 9 is a cross-sectional view illustrating the 3D image display device illustrated in FIG. 7 further including an optical film 32 between the optical switch array 20A and the lens array 35. The optical film 32 may allow light to go straight toward the lens array 35 by diffusing or refracting the light emitted from the optical switch array 20A.

Figure 10:
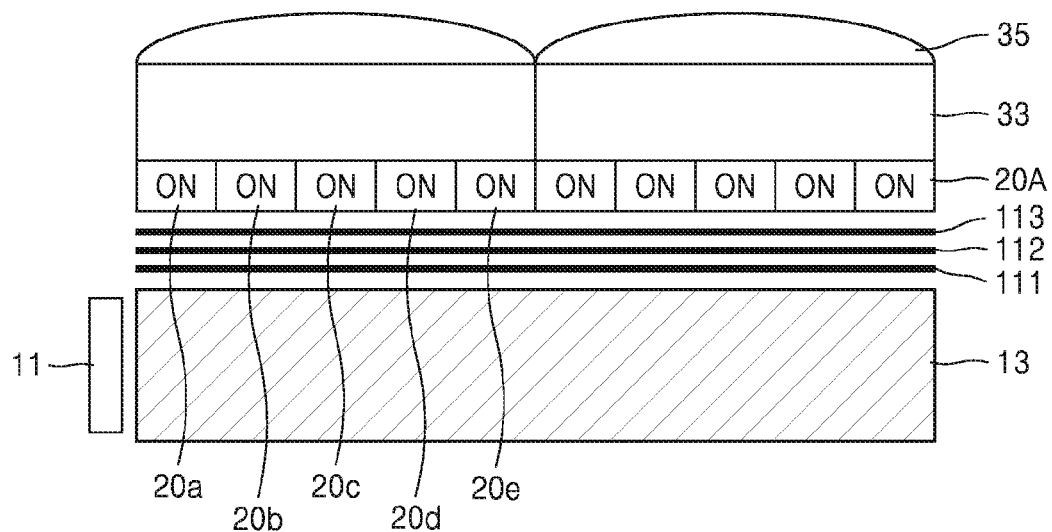
FIG. 10 is a view illustrating an operation of displaying a 2D image by using a backlight unit according to an exemplary embodiment.

FIG. 10 is a view illustrating an operation of displaying a 2D image by using a backlight unit according to an exemplary embodiment. In the backlight unit illustrated in FIG. 10, components that use the same reference numerals as those of the backlight unit of FIG. 7 may be components that perform substantially the same functions and operations. For example, a diffuser 111 that allows light coming from the light guide plate 13 to diffuse uniformly, a prism sheet 112 that corrects a light progressing path, and a brightness enhancement film 113 are further provided between the light guide plate 13 and the optical switch array 20A.

The optical switch array 20A of the backlight unit illustrated in FIG. 10 includes, for example, first to fifth micro optical switches 20a, 20b, 20c, 20d, and 20e. FIG. 10 illustrates an example of implementing a 2D mode by turning on all the first to fifth micro optical switches 20a, 20b, 20c, 20d, and 20e.

Figure 11:
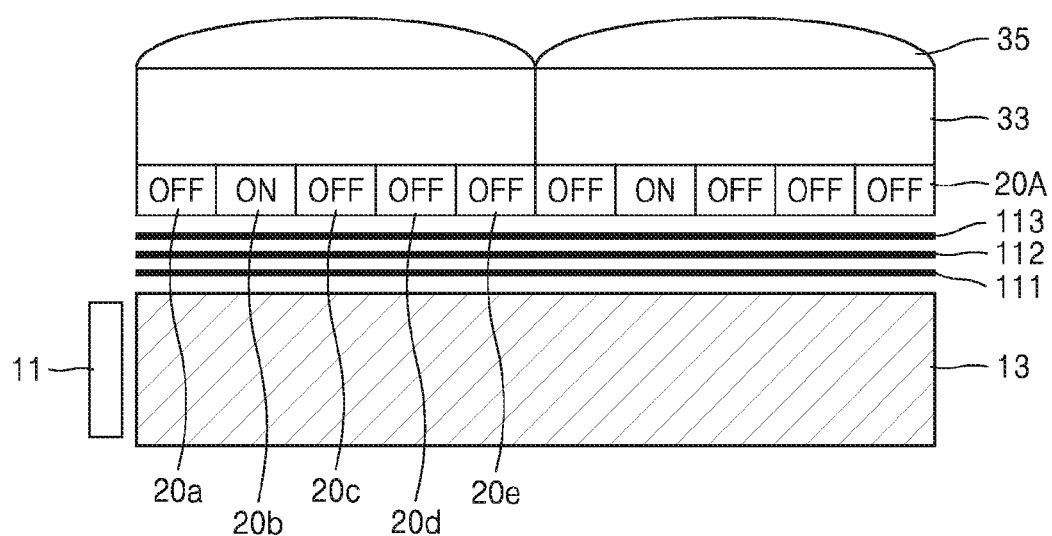
FIG. 11 is a view illustrating an operation of displaying a 3D image by using the backlight unit illustrated in FIG. 10.

FIG. 11 is a view illustrating an operation of displaying a 3D image by using the backlight unit illustrated in FIG. 10. In FIG. 11, for example, a 3D image may be displayed by turning off the first, third, fourth, and fifth micro optical switches 20a, 20c, 20d, and 20e, and turning on the second micro optical switch 20b.

An output direction of light may be adjusted by selectively on/off adjusting the micro optical switches in various combinations in each cell. For example, an output direction of light may be adjusted in each cell by turning on the first micro optical switch in the first cell, turning on the third micro optical switch in the second cell, and turning on the fifth micro optical switch in the third cell. An output direction of light in each cell is determined depending on the location of a turned-on micro optical switch, and a controller of the display panel may include data regarding correspondence relation between a turned-on micro optical switch in each cell and an output direction of light.

Light emitted from the light source 11 diffuses on the entire surface of the backlight unit via the light guide plate 13, so that the light source 11 may change to a surface light source. Light emitted upward from the light guide plate 13 may change its progressing direction by using cooperation of the location of an opened micro optical switch and the lens array 35 depending on an opening/closing operation of the first to fifth micro optical switches 20a, 20b, 20c, 20d, and 20e. For example, when the first micro optical switch 20a is opened and the rest of the micro optical switches are closed, light may be directed to the right upper portion of the drawing. For example, when the third micro optical switch 20c is opened and the rest of the micro optical switches are closed, light may be directed to the front side of the drawing. For example, when the fifth micro optical switch 20e is opened and the rest of the micro optical switches are closed, light may be directed to the left upper portion of the drawing. As described above, a 3D image may be displayed by separating the fields of vision of a left eye and a right eye through adjustment of an output direction of light for each cell. An output direction of light may be adjusted variously by using a combination of the location of an opened micro optical switch and a corresponding lens array. For example, in the case in which the optical switch array has a matrix structure, an output direction of light may be freely adjusted up/down and left/right. Therefore, a display direction of an image may be switched freely, and thus an image may be displayed by using a portrait display method and a landscape display method.

A 2D image may be displayed by opening all the micro optical switches, or opening a micro optical switch positioned at the same location for each pixel. As described above, switching between a 2D image and a 3D image may be easily performed by adjusting the opened locations of the micro optical switches. Also, a 3D image may be displayed without reduction in resolution by displaying a left eye image and a right eye image in time sequence.

Also, many audiences may view a 3D image by displaying a left eye image and a right eye image on many regions. Also, an output direction of light may be adjusted to not only a left/right direction of an image display device but also an up/down direction or a diagonal direction of the image display device. Therefore, a display direction of a 3D image may be switched when the 3D image is displayed.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A backlight unit comprising:
a light source configured to irradiate light;
a light guide plate configured to guide the irradiated light;
an optical switch array comprising micro optical switches disposed above the light guide plate for each of cells of the backlight unit; and
a lens array disposed above and corresponding to the optical switch array,
wherein each of the micro optical switches comprises a substrate, a first electrode layer disposed on the substrate and comprising first holes, a second electrode layer spaced apart from the first electrode layer and comprising second holes not facing the first holes, and an insulating layer disposed above the first electrode layer and comprising holes corresponding to the first holes, and
wherein each of the first holes has a width that is less than or equal to a width between an adjacent pair of the second holes.

2. The backlight unit of claim 1, wherein the second electrode layer is configured to move to the first electrode layer, and cover the first holes, in response to a voltage being applied between the first electrode layer and the second electrode layer to generate electrostatic attraction between the first electrode layer and the second electrode layer.

3. The backlight unit of claim 1, wherein the substrate is transparent.

4. The backlight unit of claim 1, wherein each of the micro optical switches further comprises:
a spacer disposed between the first electrode layer and the second electrode layer and configured to support the second electrode layer.

5. The backlight unit of claim 1, further comprising:
an optical film disposed above the second electrode layer.

6. The backlight unit of claim 1, further comprising:
a reflector disposed below the light guide plate and configured to reflect light.

7. The backlight unit of claim 1, further comprising:
a diffusion layer disposed between the light guide plate and the optical switch array.

8. A three-dimensional (3D) image display device comprising:
a backlight unit configured to emit light; and
a display panel configured to produce an image, using the emitted light,
wherein the backlight unit comprises:
a light source configured to irradiate light;
a light guide plate configured to guide the irradiated light;
an optical switch array comprising micro optical switches disposed above the light guide plate for each of cells of the backlight unit; and
a lens array disposed above and corresponding to the optical switch array,
wherein each of the micro optical switches comprises a substrate, a first electrode layer disposed on the substrate and comprising first holes, a second electrode layer spaced apart from the first electrode layer and comprising second holes not facing the first holes, and an insulating layer disposed above the first electrode layer and comprising holes corresponding to the first holes, and
wherein each of the first holes has a width that is less than or equal to a width between an adjacent pair of the second holes.

9. The 3D image display device of claim 8, wherein the second electrode layer is configured to move to the first electrode layer, and cover the first holes, in response to a voltage being applied between the first electrode layer and the second electrode layer to generate electrostatic attraction between the first electrode layer and the second electrode layer.

10. The 3D image display device of claim 8, wherein the substrate is transparent.

11. The 3D image display device of claim 8, wherein each of the micro optical switches further comprises:
a spacer disposed between the first electrode layer and the second electrode layer and configured to support the second electrode layer.

12. The 3D image display device of claim 8, wherein the backlight unit further comprises:
an optical film disposed above the second electrode layer.

13. The 3D image display device of claim 8, wherein the backlight unit further comprises:
a reflector disposed below the light guide plate and configured to reflect light.

14. The 3D image display device of claim 8, wherein the backlight unit further comprises:
- a space layer disposed between the optical switch array and the lens array.

15. The 3D image display device of claim 8, wherein the backlight unit further comprises:
- a diffuser configured to cause the guided light to diffuse uniformly;
- a prism sheet configured to correct a light progressing path of the diffused light; and
- a brightness enhancement film disposed above the prism sheet,
- wherein the diffuser, the prism sheet, and the brightness enhancement film are disposed between the light guide plate and the optical switch array.

\* \* \* \* \*